United States Patent
He et al.

(10) Patent No.: US 9,565,081 B2
(45) Date of Patent: Feb. 7, 2017

(54) PHONE THERMAL CONTEXT

(71) Applicants: Robert He, Pflugerville, TX (US); Bryant Genepang Luk, Round Rock, TX (US); Christopher Diebold O'Toole, Cedar Park, TX (US)

(72) Inventors: Robert He, Pflugerville, TX (US); Bryant Genepang Luk, Round Rock, TX (US); Christopher Diebold O'Toole, Cedar Park, TX (US)

(73) Assignee: eBay Inc., San Jose, CA (US)

( * ) Notice: Subject to any disclaimer, the term of this patent is extended or adjusted under 35 U.S.C. 154(b) by 141 days.

(21) Appl. No.: 14/281,823

(22) Filed: May 19, 2014

(65) Prior Publication Data
US 2015/0333960 A1 Nov. 19, 2015

(51) Int. Cl.
| | |
|---|---|
| H04L 12/24 | (2006.01) |
| H04L 29/08 | (2006.01) |
| H04L 12/26 | (2006.01) |
| H04M 1/725 | (2006.01) |
| H04W 4/02 | (2009.01) |
| G01S 19/14 | (2010.01) |

(52) U.S. Cl.
CPC .......... *H04L 43/08* (2013.01); *G01S 19/14* (2013.01); *H04L 41/0816* (2013.01); *H04L 67/18* (2013.01); *H04M 1/72569* (2013.01); *H04W 4/023* (2013.01); *H04W 4/026* (2013.01); *H04L 67/22* (2013.01)

(58) Field of Classification Search
CPC .......... H04N 5/33; H01L 27/146; H01L 31/16
USPC ...... 709/221, 222, 223, 224; 250/341.1, 349
See application file for complete search history.

(56) References Cited

U.S. PATENT DOCUMENTS

| | | | |
|---|---|---|---|
| 6,359,585 B1 | 3/2002 | Bechman et al. | |
| 7,292,154 B1 * | 11/2007 | Baier | G08B 17/00 116/101 |
| 8,315,746 B2 | 11/2012 | Cox et al. | |
| 2007/0000317 A1 | 1/2007 | Berti | |

(Continued)

FOREIGN PATENT DOCUMENTS

| | | |
|---|---|---|
| WO | WO-2007065736 A1 | 6/2007 |
| WO | WO-2013052266 A3 | 4/2013 |
| WO | WO-2015179315 A1 | 11/2015 |

OTHER PUBLICATIONS

"Principles of Non-Contact Temperature Measurement"—Raytek, Klaus-dieter Gruner, Dec. 2003 http://support.fluke.com/raytek-sales/Download/Asset/IR_THEORY_55514_ENG_REVB_LR.PDF.*

(Continued)

*Primary Examiner* — Randy Scott
(74) *Attorney, Agent, or Firm* — Schwegman Lundberg & Woessner, P.A.

(57) ABSTRACT

A thermal context manager (hereinafter "TCM") detects a thermal state and a position of a computing device. Based on the detected thermal state(s) and the detected position(s) of the computing device, the TCM initiates an action associated with the computing device. The TCM continually monitors the computing device in order to create a thermal state profile of the computing device. To create the thermal state profile, the TCM stores data representing each detected instance of the thermal state of the computing device and data representing each detected position of the computing device.

17 Claims, 6 Drawing Sheets

(56) References Cited

U.S. PATENT DOCUMENTS

| | | | |
|---|---|---|---|
| 2007/0070003 A1* | 3/2007 | Nakamura | G09G 3/3614 345/87 |
| 2008/0068258 A1* | 3/2008 | Maezawa | G01S 19/30 342/357.62 |
| 2012/0049933 A1 | 3/2012 | Riechel et al. | |
| 2012/0159200 A1 | 6/2012 | Ardron | |
| 2012/0179301 A1 | 7/2012 | Aivaliotis et al. | |
| 2012/0272078 A1 | 10/2012 | Anderson et al. | |
| 2012/0272086 A1 | 10/2012 | Anderson et al. | |
| 2012/0311357 A1 | 12/2012 | Andrews | |
| 2013/0326239 A1* | 12/2013 | Andrews | G06F 1/206 713/300 |
| 2014/0086600 A1* | 3/2014 | Cui | G03G 21/20 399/33 |
| 2014/0107965 A1* | 4/2014 | Mishra | G01N 25/20 702/136 |

OTHER PUBLICATIONS

"International Application Serial No. PCT/US2015/031422, International Search Report mailed Aug. 19, 2015", 3 pgs.
"International Application Serial No. PCT/US2015/031422, Written Opinion mailed Aug. 19, 2015", 9 pgs.

* cited by examiner

500 ⇘

335
Initiate action associated with the computing device based on the thermal state(s) and the position(s)

505
Identify geographical location proximate to current location of the computing device

510
Initiate notification for the computing device based on current location of the computing device being proximate to the geographical location

515
Initiate a change of temperature of at least a portion of the computing device

*FIG. 5*

PHONE THERMAL CONTEXT

TECHNICAL FIELD

The present application relates generally to the technical field of mobile computing and, in one specific example, to monitoring and processing a current state(s) of a computing device.

BACKGROUND

Location systems, including global positioning systems (GPS), have been developed for determining and tracking the various locations of users of wireless mobile devices such as cellular phones, as well as various triangulation systems that use cellular telephone signals, broadcast television signals, or the like. Global positioning systems allow for the tracking and monitoring of a users' current location. Conventional global positioning systems further provide mapping functions which show a distance and desirable route(s) between an origin location and destination as well as an expected amount of time it will take to travel from the origin location to the destination. Such conventional GPS data is accessible via any computing device with an Internet browsing capability.

BRIEF DESCRIPTION OF THE DRAWINGS

Some embodiments are illustrated by way of example and not limitation in the figures of the accompanying drawings in which:

FIG. 5 is a flow diagram illustrating an example of method operations involved in a method of a thermal context manager initiating a change of temperature of a computing device based on a current location of the computing device being proximate to a geographical location, according to some embodiments of the invention;

DETAILED DESCRIPTION

Figure 1:
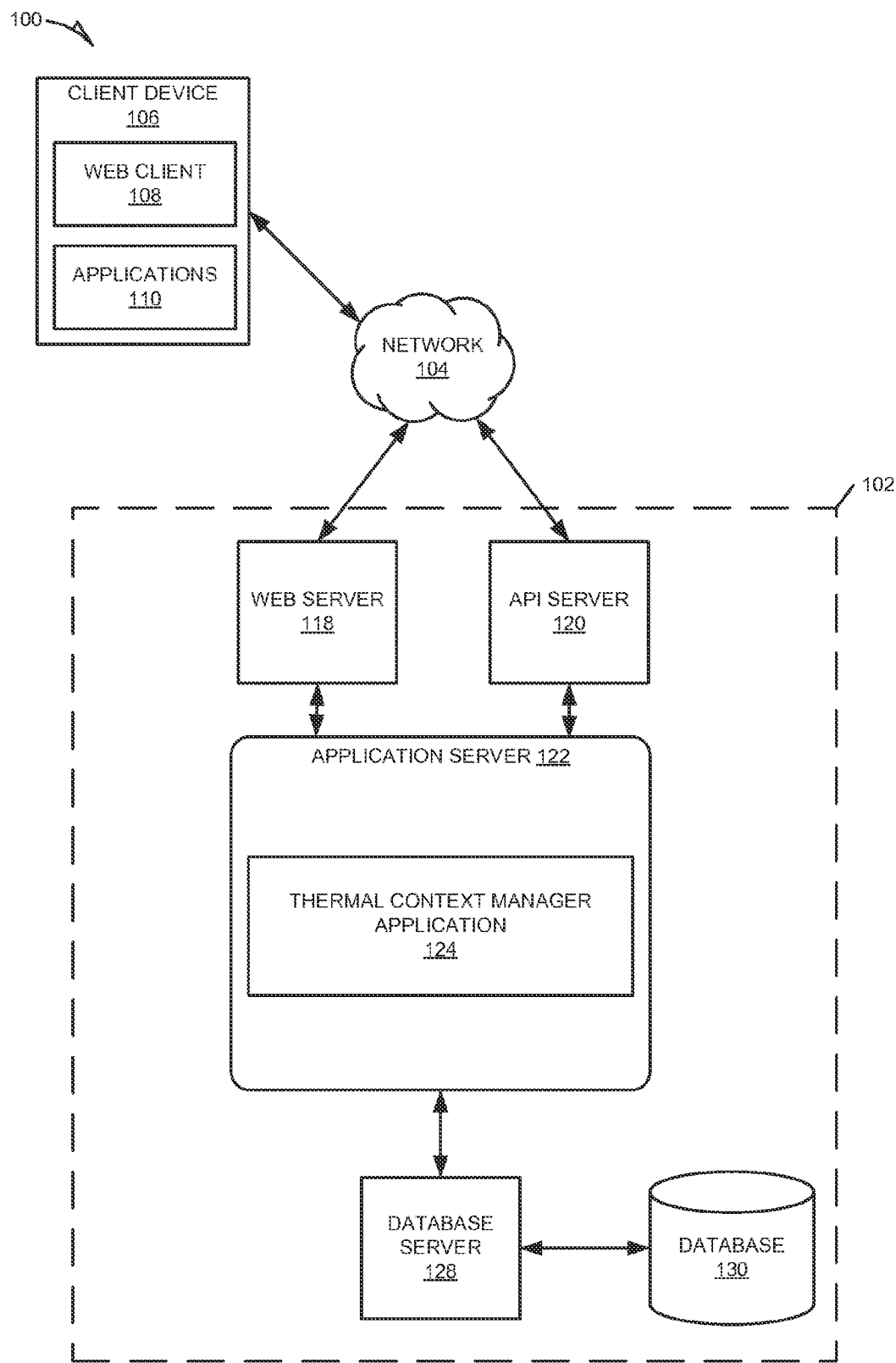
FIG. 1 is a network diagram depicting a client-server system, within which one example embodiment of a thermal context manager may be deployed, according to some embodiments of the invention.

Example methods and systems for phone thermal context are described. In the following description, for purposes of explanation, numerous specific details are set forth in order to provide a thorough understanding of example embodiments. It will be evident, however, to one skilled in the art that the present invention may be practiced without these specific details.

According to various embodiments described herein, a thermal context manager (hereinafter "TCM") detects a thermal state and a position of a computing device. Based on the detected thermal state(s) and the detected position(s) of the computing device, the TCM initiates an action associated with the computing device. The TCM continually monitors the computing device in order to create a thermal state profile of the computing device. To create the thermal state profile, the TCM stores data representing each detected instance of the thermal state of the computing device and data representing each detected position of the computing device.

In various embodiments, the TCM detects a thermal state as a change (or consistency) in temperature of at least a portion of the computing device. The temperature change (or consistency) can occur at any portion(s) of the computing device including an external case of the computing device.

In various embodiments, the TCM initiates various actions associated with the computing device based on the thermal state(s) and the position(s) of the computing device. Such actions include: initiating notifications, adjusting computing device settings and initiating the execution of various programs on the computing device—such as a background process.

In various embodiments, the TCM continually requests for and receives the thermal state(s) and the position(s) (i.e. orientation, geographical location) of the wireless mobile device and creates a thermal state profile associated with the wireless mobile device. The thermal state profile stores data representing each instance of the wireless mobile device's thermal state(s) and position(s). The thermal state profile can include additional data, such as time(s) of day, rate(s) of travel, geographical location(s) and data that was sent from and received by the wireless mobile device.

In various embodiments, the thermal state profile includes preferences selected by a user associated with the wireless mobile device. The preferences control whether or not the TCM initiates actions based on whether recently detected temperatures and positions are consistent (or inconsistent with various portions of data in the thermal state profile.

According to an example, a user takes a wireless mobile device out of a pocket and places it on a desk. In various embodiments, the wireless mobile device continually processes data from a thermal state sensor (e.g. temperature sensor) and sends the data to the TCM. As the TCM receives the data from the wireless mobile device, the TCM analyzes the data and detects a change in temperature of the wireless mobile device on account of the wireless mobile device being taken out of the pocket and being placed on the desk. The TCM further detects that the wireless mobile device's temperature is relatively stable after the temperature change occurs.

The wireless mobile device continually processes data from a position sensor (e.g. accelerometer, geographical position system) and sends the data to the TCM. As the TCM receives the data, the TCM detects that an orientation of the wireless mobile device is consistent over a period of time as the temperature changes (and/or after the temperature change stabilizes).

The thermal state profile already includes a data pattern(s) based on data received by the TCM from when the user previously placed the wireless mobile device on various surfaces. The TCM determines that the current detected temperature consistency and the current detected orientation consistency is substantially similar to the data pattern(s).

Based on the determination, in order to make sure the user doesn't forget the location of the wireless mobile device, the TCM sends an instruction to the wireless mobile device to initiate a sound (such as a chirping sound) at the wireless mobile device intended to direct the user's attention to the wireless mobile device.

In various embodiments, the TCM uses a data pattern(s) in the thermal state profile as a threshold in order to determine whether various actions should (or shouldn't) be initiated. For example, in the scenario discussed above, the TCM references the thermal state profile and detects a data pattern(s) in which the wireless mobile device's thermal state(s) and orientation(s) are relatively consistent during the daytime of multiple week days. This may be due to the user's habit of placing the wireless mobile device upon an office desk for most of the work day. In this scenario, the TCM does not send an instruction to the wireless mobile device to initiate a sound (i.e. the chirping sound) since the current consistency of the wireless mobile device's temperature and orientation is not atypical enough with respect to the data pattern(s) in the thermal state profile.

It is understood that various embodiments include the generation of a module(s) to cause a computing device(s) to perform any and/or all of the actions described herein. Once the module(s) is generated, the module(s) is sent for installation on the computing device(s). In one embodiment, the generated modules comprise source code that, when compiled by a computing device(s), creates object code that causes the computing device(s) to perform any or all of the various actions, steps, methods, and/or operations described herein. In other embodiments, the generated modules comprise object code that causes the computing device(s) to perform various actions, steps, methods, and/or operations described herein.

Architecture

FIG. 1 is a network diagram depicting a client-server system 100, within which one example embodiment of a thermal context manager may be deployed. A networked system 102, in the example, provides server-side functionality, via a network 104 (e.g., the Internet or Wide Area Network (WAN)) to one or more clients. FIG. 1 illustrates, for example, a web client 108 (e.g., a browser, such as the Internet Explorer browser developed by Microsoft Corporation of Redmond, Washington State) and a client application(s) 110 executing on a client device 106, such as a wireless mobile device or any other type of computing device.

An Application Program Interface (API) server 120 and a web server 118 are coupled to, and provide programmatic and web interfaces respectively to, an application server(s) 122. The application server 122 hosts a thermal context manager application 124. The application server 122 is, in turn, shown to be coupled to a database server(s) 128 that facilitates access to a database(s) 130. The web client 106 accesses the thermal context manager application 124 via by web server 116.

While the thermal context manager application 124 is shown in FIG. 1 to form part of the networked system 102, it will be appreciated that, in alternative embodiments, the thermal context manager application 124 may form part of a service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. Any portion, or portions, of the thermal context manager 124 may reside and be executed from any kind of computing device. The thermal context manager application 124 could also be implemented as standalone software program(s), which does not necessarily have networking capabilities.

Data Structures

Figure 2:
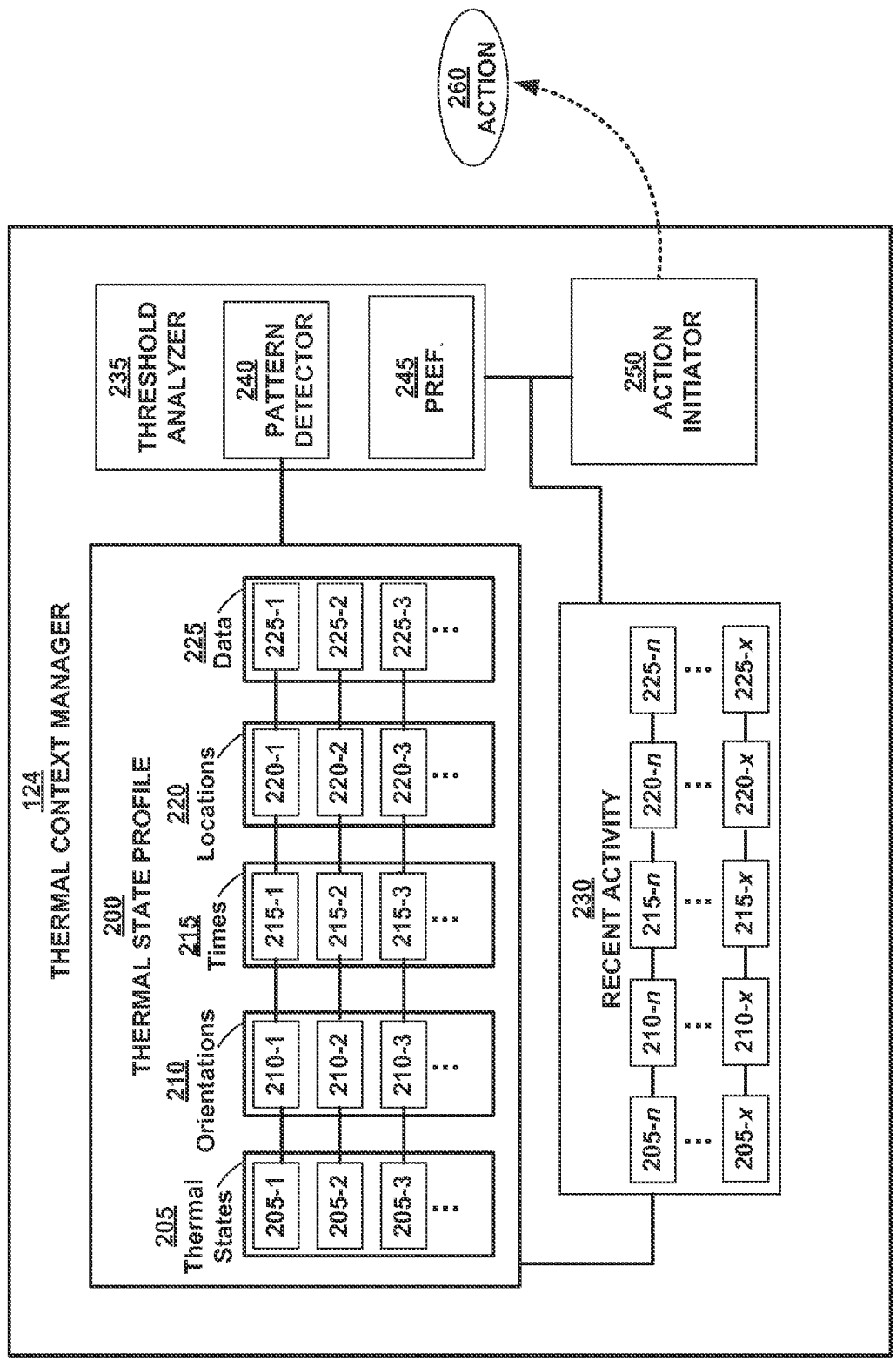
FIG. 2 is a high-level entity-relationship diagram, illustrating various modules implemented by a thermal context manager, according to some embodiments of the invention.

FIG. 2 is a high-level entity-relationship diagram, illustrating various modules implemented by a thermal context manager, according to some embodiments of the invention.

As shown in FIG. 2, the TCM 124 includes a thermal state profile 200 associated with a computing device, such as a wireless mobile device. It is understood that the TCM 124 creates and processes multiple thermal state profiles, each associated with a respective computing device. In some embodiments, the TCM 124 is executed locally in the wireless mobile device, and detects thermal state data and position data from respective sensors of the wireless mobile device.

In other embodiments, the TCM 124 is not local to the wireless mobile device. In such a scenario, the wireless mobile device sends thermal state data and position data to the TCM 124. The TCM 124 detects the thermal state data and the position data upon receipt of the thermal state data and the position data sent from the wireless mobile device.

The TCM 124 detects and stores the thermal states 205, orientations 210, locations 220 of a computing device that correspond with times 215 and various additional data 225. The TCM 124 utilizes an action initiator 250 to initiate an action 260 (or send an instruction to an initiate an action 260) on the computing device.

In order to create the thermal state profile 200, the TCM 124 detects and stores instances of thermal states 205-1, 205-2, 205-3 . . . 205-n, . . . 205-x . . . , instances of orientations 210-1, 210-2, 210-3 . . . 210-n, . . . 210-x . . . , instances of locations 220-1, 220-2, 220-3 . . . 220-n, . . . 220-x . . . , instances of times 215-1, 215-2, 215-3 . . . 215-n, . . . 215-x . . . and instances of additional data 225-1, 225-2, 225-3 . . . 225-n, . . . 225-x . . . (e.g. voice, text, video, picture, internet data) sent from and received at the computing device. It is noted that instances of thermal states 205-n to 205-x, instances of orientations 210-n to 210-x, instances of times 215-n to 215-x, instances of locations 220-n to 220-x and a portion of the additional data 225-n to 225-x represent recent activity 230 associated with the computing device.

The TCM 124 includes a threshold analyzer 124 to determine whether data from recent activity 230 of the computing device triggers an action. The threshold analyzer includes a pattern detector 240 that continually analyzes and processes the thermal state profile 200 and the recent activity 230 in order to determine whether or not the recent activity 230 is similar enough (or different enough) from data pattern(s) in the thermal state profile. In various embodiments, the threshold analyzer 124 triggers an action 260 based on whether or not the recent activity 230 is substantially similar to (or substantially different than) a data pattern(s) in the thermal state profile 200.

The threshold analyzer 235 also includes preferences 245 selected by a user of a computing device. The preferences 245 indicate what kind of actions are allowed and/or prohibited (e.g. sounds, vibration, temperature change, notifications, receipt of offers, automatic acceptance of offers). The preferences 245 further indicate what kind of actions are allowed and/or prohibited during a certain time period (e.g. weekday, weekend, workday, evening, morning, lunch time). The preferences can by used separately or in combination with the pattern detector 240.

Discussion of aspects of various embodiments of the present invention illustrated in FIG. 2 continues below with respect to discussion of flow diagrams 300, 400 and 500.

Flowcharts

Figure 3:
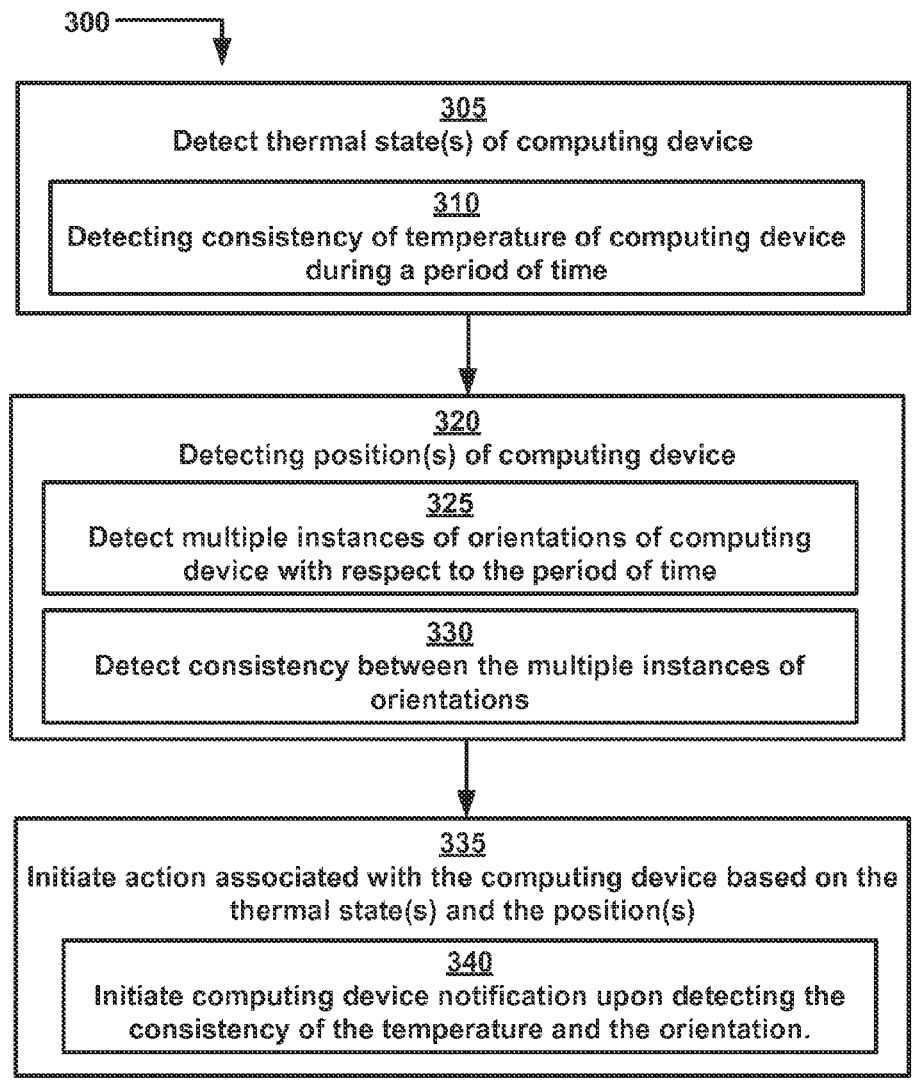
FIG. 3 is a flow diagram illustrating an example of method operations involved in a method of a thermal context manager initiating an action based on a temperature consistency and orientation consistency of a computing device, according to some embodiments of the invention.

FIG. 3 is a flow diagram 300 illustrating an example of method operations involved in a method of a thermal context manager 124 initiating an action based on a temperature consistency and orientation consistency of a computing device, according to some embodiments of the invention.

It is understood that, in various embodiments, a computing device continually obtains data regarding the computing device's thermal state(s) and position(s) from sensors in the computing device. The computing device sends the data to the TCM 124. In other embodiments, it is understood that the TCM 124 resides on the computing device and continually processes data regarding the computing device's thermal state(s) and position(s) as described herein.

At step 305, the TCM 124 detects a thermal state 205-$n$ . . . 205-$x$ of a computing device. At step 310, the TCM 124 detects a consistency of temperature of the computing device. According to an example scenario, a user takes a wireless mobile device out of a pocket and places it on a desk. The TCM 124 detects that the wireless mobile device experiences a change of temperature on account of being taken out of the pocket and being placed on the desk. However, after detecting the change in temperature, the TCM 124 further detects a consistency between thermal state instances 205-$n$ . . . 205-$x$ over a period of time 220-$n$ . . . 220-$x$. Hence, the TCM 124 detects that the wireless mobile device's temperature has stabilized after the temperature change.

At step 320, the TCM 124 detects a position 210-$n$ . . . 210-$x$ of the computing device. At step 325, the TCM 124 detects multiple instances of the computing device's orientation 210-$n$ . . . 210-$x$ with respect to a period of time. Continuing with the example scenario, the TCM 124 detects orientation instances 210-$n$ . . . 210-$x$ over the period of time 220-$n$ . . . 220-$x$ after the mobile wireless device's temperature change stabilized. At step 330, the TCM detects a consistency between the multiple orientation instances 210-$n$ . . . 210-$x$. Specifically, the TCM 124 detects that the values of each orientation instance 210-$n$ . . . 210-$x$ are the same (or relatively the same).

At step 335, the TCM 124 initiates an action 260 associated with the computing device based on the detected thermal states 205-$n$ . . . 205-$x$ and detected positions 210-$n$ . . . 210-$x$. At step 340, the TCM 124 initiates a notification upon detecting the consistencies of the detected thermal state instances 205-$n$ . . . 205-$x$ and the consistencies detected orientation instances 210-$n$ . . . 210-$x$. For example, as in the example scenario, in order to make sure the user doesn't forget the location of the wireless mobile device, the TCM 124 initiates a sound (such as a chirping sound) by the wireless mobile device intended to direct the user's attention to the wireless mobile device. Other types of notifications initiated by the TCM 124 include, but are not limited to, a vibration, an alert displayed by the wireless mobile device and a change of temperature of the wireless mobile device.

Figure 4:
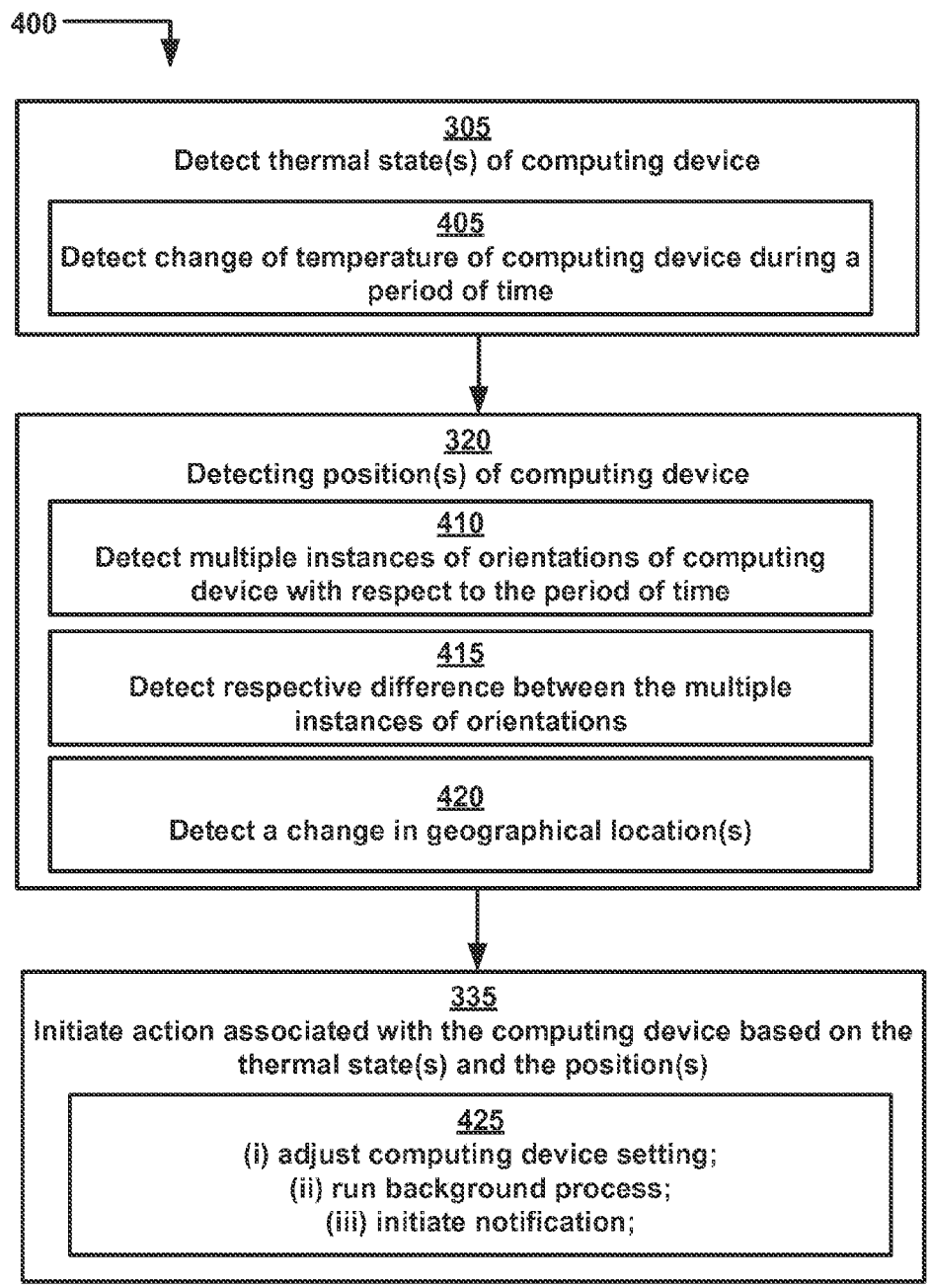
FIG. 4 is a flow diagram illustrating an example of method operations involved in a method of a thermal context manager initiating an action based on a temperature change and orientation inconsistency of a computing device, according to some embodiments of the invention.

FIG. 4 is a flow diagram 400 illustrating an example of method operations involved in a method of a thermal context manager 124 initiating an action based on a temperature change and orientation inconsistency of a computing device, according to some embodiments of the invention.

At step 405, the TCM 124 detects a change of temperature of a computing device during a period of time. According to an example scenario, a user places a mobile wireless device in a pocket of the user's pants. The temperature of the mobile wireless device will change over a period of time on account of being placed in the user's pants pocket. In various embodiments, the TCM 124 detects the temperature change by detecting an increase in the values of detected thermal state instances 205-$n$ . . . 205-$x$ during a period of time 215-$n$ . . . 215-$x$ that occurs after the wireless mobile device was a placed in the pocket.

At step 410, the TCM 124 detects multiple instances of orientations 210-$n$ . . . 210-$x$ of the computing device with respect to the period of time 215-$n$ . . . 215-$x$. Continuing with the example scenario, the orientation of the wireless mobile device will continually change as the user walks. The orientation of the wireless mobile device will undergo a change from when the user stretches a leg out to take a step to when the step is completed and the opposite leg is stretched out to take the next step. Such an orientation change will be repeated continually as the user takes additional strides with the wireless mobile device in the user's pocket. The TCM 124 detects the repeated, continual change in the wireless mobile device's orientation as the user walks.

At step 415, the TCM 124 detects respective differences between the multiple instances of the orientations 210-$n$ . . . 210-$x$ of the computing device with respect to the period of time 215-$n$ . . . 215-$x$, Continuing with the example scenario, each time the user stretches out a leg to take a step, the TCM 124 detects an orientation instance value(s) that falls within a certain range. Each time the user completes a step, the TCM 124 detects an orientation instance value(s) that falls within a different range. That is, the TCM 124 detects that certain values in the orientation instances 210-$n$ . . . 210-$x$ repeatedly fall within a certain range while other values repeatedly fail within different ranges.

At step 420, the TCM 124 detects a change in the computing device's geographical location. Again, continuing with the example scenario, as the user walks, the wireless mobile device's geographical location gradually changes. The TCM 124 detects the change in the wireless mobile device's location based on the values of the detected geographical location instances 220-$n$ . . . 220-$x$.

In addition, the TCM 124 can detect additional data 225-$n$ . . . 225-$x$, such as the rate at which the wireless mobile device is traveling. Based on the detected temperature increase followed by a temperature stabilization paired with orientation instance values 210-$n$ . . . 210-$x$ that each repeatedly fall within various ranges as the geographical location instances 220-$n$ . . . 220-$x$ gradually change according to a rate of travel 225-$n$ . . . 225-$x$, the TCM 124 determines that the wireless mobile device's recent activity 230 in aggregate is a data model representative of the user walking down a particular city street with the wireless mobile device in a pant pocket.

At step 425, the TCM 124 initiates an action 260 on the computing device such as at least one of (i) adjusting a computing device setting, (ii) running a background process(es) and (iii) initiating a notification. Based on the determination that the user is walking down a particular city street, the TCM 124 initiates an instruction to adjust a mobile wireless device setting—such as increasing a volume of the wireless mobile device—so that the user will be able to hear an incoming call above the level of ambient noise typical of a city street.

FIG. 5 is a flow diagram 500 illustrating an example of method operations involved in a method of a thermal context manager 124 initiating a change of temperature of a computing device based on a current location of the computing device being proximate to a geographical location, according to some embodiments of the invention.

At step 505, the TCM 124 identifies a geographical location proximate to the current location of the computing device. Continuing with the example scenario discussed above with regard to FIG. 4, the TCM 124 identifies a store near any of the recently detected location instances 220-*n* . . . 220-*x*.

At step 510, the TCM 124 initiates a notification for the computing device based on the current location of the computing device being proximate to the identified geographical location. In one embodiment, the TCM 124 initiates an offer from the store to be displayed by the wireless mobile device. The offer can be received by the wireless mobile device from the store and/or generated by the wireless mobile device.

In another embodiment, the TCM 124 executes a threshold analyzer 235 to determine whether an action 260 should be initiated—such as whether the offer should be displayed to the user. For example, the TCM 124 can use the wireless mobile device's rate of travel in the additional data 225-*n* . . . 225-*x* as a threshold as to whether the offer is sent to the mobile wireless device. In other words, the TCM 124 initiates display of the offer when the wireless mobile device's rate of travel reflected in the additional data 225-*n* . . . 225-*x* is less than (or greater than) a threshold rate of travel.

The TCM 124 can compare a distance between the wireless mobile device's current location(s) 220-*n* . . . 220-*x* and the store's location against a distance threshold in order to deter nine whether the offer should be displayed on the mobile wireless device. In other words, the TCM 124 initiates display of the offer only when a distance between the store and the wireless mobile device is below a threshold distance.

In another embodiment, the TCM 124 accesses a preference(s) 245 selected by the user that indicates when the TCM 124 should (or should not) initiate various actions, for example: when detected rates of travel indicate the user is walking (or driving), during a certain time(s) of day, when the user is actively using the wireless mobile device (i.e. during a phone call, texting, surfing the Internet), or when the user is using the wireless mobile device to take a picture or a video, etc. Furthermore, a preference 245 can indicate that the user does (or doesn't) want to receive offers associated with various types of retailers when the user is walking (or driving), or during a certain time(s) of day.

In another embodiment, the TCM 124 utilizes a pattern detector 240 to identify a data model(s) of the user's previous activities. Specifically, the TCM 124 can determine whether to initiate various actions upon detecting that a data pattern in the thermal state profile 200 is similar to (or different than) the mobile wireless device's recent activity 230. For example, if the TCM 124 identifies that the thermal state profile 200 includes a recurring data pattern indicating the user often visits coffee shops while walking down city streets, then—in the example scenario discussed with regard to FIGS. 4 and 5—the TCM 124 initiates an offer from a nearby coffee shop to be displayed on the wireless mobile device.

At step 515, the TCM 124 initiates a change of temperature of the computing device. For example, after the TCM 124 initiates display of an offer from the store, the TCM 124 further initiates an increase in the temperature of the mobile wireless device. The user will notice the mobile wireless device getting warmer in the pocket and pull it out of the pocket and view the displayed offer.

Computer System(s)

Figure 6:
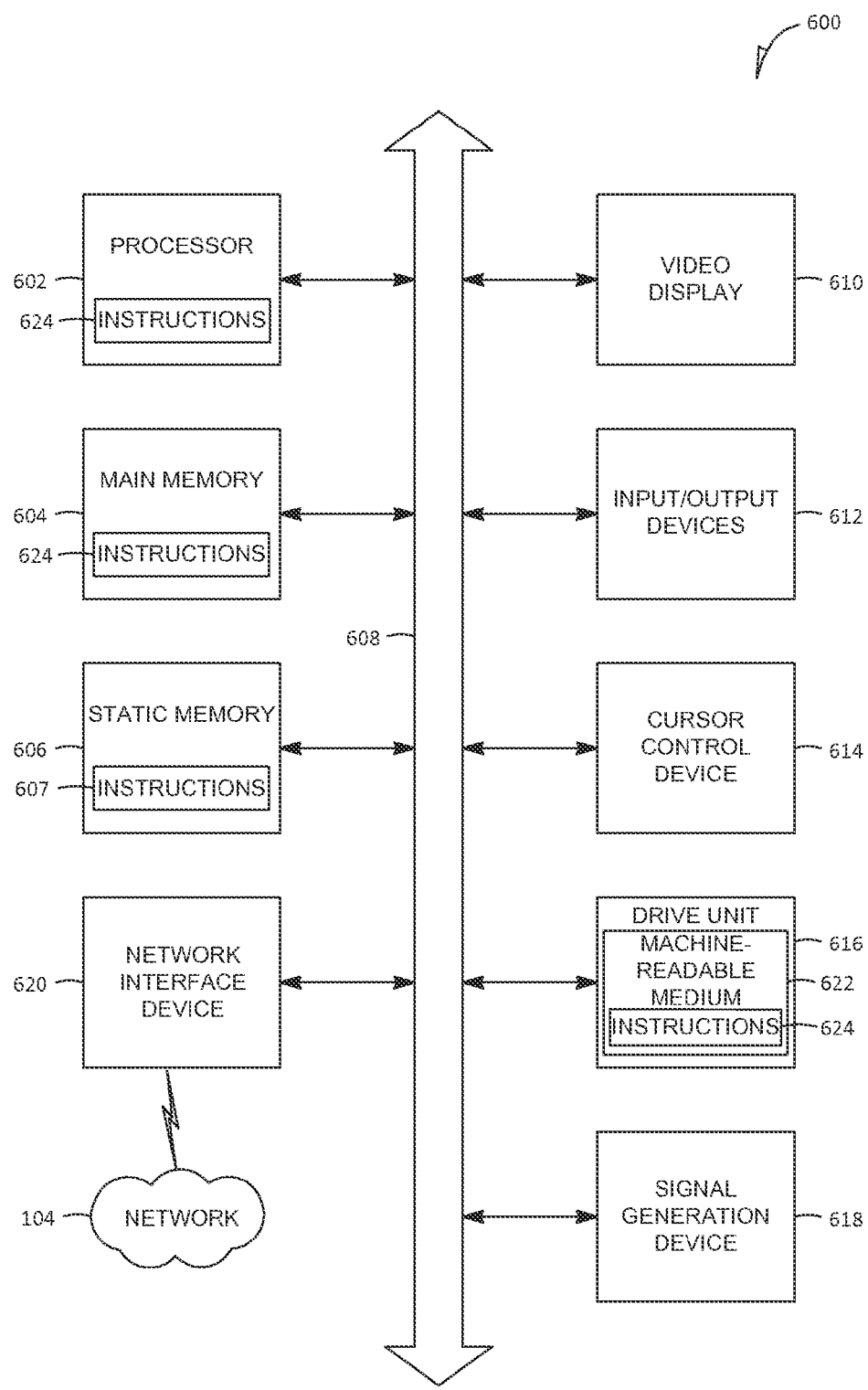
FIG. 6 shows a diagrammatic representation of machine in the example form of a computer system within which a set of instructions, for causing the machine to perform any one or more of the methodologies discussed herein, may be executed.

FIG. 6 shows a diagrammatic representation of machine in the example form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., central processing unit (CPU) a graphics processing unit (GPU) or both), a main memory 604 and a static memory 606 (with one or more sets of instructions 607) which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions 624 (e.g., software) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 104 via the network interface device 620.

While not illustrated, it is understood that that computer system 600 can further include sensors that create data regarding a thermal state of the computer system 600, an orientation of the computer system 600 and a current location of the computer system 600. In various embodiments, the computer system 600 includes a temperature sensor, an accelerometer and/or a global position system for identifying the current location of the computer system 600.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method(s) and system(s) to detect a thermal state(s) and position(s) of a computing device are disclosed herein in accordance with various embodiments. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer system comprising:
   a processor;
   a memory device holding an instruction set executable on the processor to cause the computer system to perform operations comprising:
   detecting a thermal state of the computer system comprising a change of temperature of at least a portion of the computer system during a period of time;
   detecting multiple instances of a physical orientation of the computer system comprising:
     detecting the multiple instances of the physical orientation of the computer system, wherein each of the multiple instances of the physical orientation of the computer system occur during the period of time of the change of temperature; and
     detecting respective differences between each of the multiple instances of the physical orientation of the computer system; and
   initiating a notification to be displayed at the computer system based on the change of temperature indicated by the thermal state and due to a first subset of the respective differences falling within a first range of physical orientation differences and a second subset of the respective differences falling within a second range of physical orientation differences, the first range and the second range being different than each other.

2. The computer system as in claim 1, further comprising:
   detecting a change in a geographical location of the computer system with respect to the period of time.

3. The computer system as in claim 2, further comprising:
   upon detecting the change of temperature, the first subset falling within the first range of physical orientation differences and the second subset falling within the second range of physical orientation and the change in the geographical location, performing at the computer system at least one of:
     an adjustment of at least one setting of the computer system; and
     an execution of at least one background process of the computer system.

4. The computer system as in claim 2, wherein initiating a notification to be displayed at the computer system comprises:
   identifying a particular geographical location proximate to a current location of the computer system; and
   initiating a particular notification at the computer system based on the current location of the computer system being proximate to the particular geographical location.

5. The computer system as in claim 4, further comprising:
   initiating a change in temperature of at least the portion of the computer system.

6. The computer system as in claim 1, further comprising:
   creating a thermal state profile of the computer system, which comprises:
     storing data representing each detected instance of the thermal state of the computer system; and
     storing data representing each detected instance of the physical orientation of the computer system.

7. The computer-implemented method as in claim 1, further comprising:
   creating a thermal state profile of the computing device, which comprises:
     storing data representing each detected instance of the thermal state of the computing device; and
     storing data representing each detected instance of the physical orientation of the computing device.

8. The computer system as in claim 1, wherein detecting respective differences between each of the multiple instances of the physical orientation of the computer system comprises:
   detecting a first difference between a first physical orientation of the computer system and a second physical orientation of the computer system; and
   detecting a second difference between the second physical orientation and a third physical orientation of the computer system, wherein the first physical orientation, the second physical orientation and the third physical orientation occur during the period of time.

9. The computer system as in claim 8, wherein the first physical orientation, the second physical orientation and the third physical orientation are detected via at least one of an accelerometer of the computer system and at least a portion of a global positioning system included in the computer system.

10. The computer system as in claim 8, wherein initiating the notification to be displayed at the computer system comprises:
    initiating the notification based in part on the first difference and at least one of the second and third differences being within the first range of physical orientation differences.

11. A non-transitory computer-readable medium storing executable instructions thereon, which, when executed by a processor, cause the processor to perform operations including:
    detecting a thermal state of a computing device comprising a change of temperature of at least a portion of the computing device during a period of time;
    detecting multiple instances of a physical orientation of the computer system comprising:
      detecting the multiple instances of the physical orientation of the computer system, wherein each of the multiple instances of the physical orientation of the computer system occur during the period of time of the change of temperature; and detecting respective differences between each of the multiple instances of the physical orientation of the computer system; and initiating a notification to be displayed at the computer system based on the change of temperature indicated by the thermal state and due to a first subset of the respective differences falling within a first range of physical orientation differences and a second subset of the respective differences falling within a second range of physical orientation differences, the first range and the second range being different than each other.

12. The non-transitory computer-readable medium as in claim 11, further comprising:

detecting a change in a geographical location of the computing device with respect to the period of time.

13. The non-transitory computer-readable medium as in claim 12, further comprising:

upon detecting the change of temperature, the first subset falling within the first range of physical orientation differences and the second subset falling within the second range of physical orientation and the change in the geographical location, performing at the computer system at least one of:

an adjustment of at least one setting of the computing device; and an execution of at least one background process of the computing device.

14. The non-transitory computer-readable medium as in claim 12, wherein initiating a notification to be displayed at the computing device comprises:

identifying a particular geographical location proximate to a current location of the computing device; and initiating a particular notification at the computing device based on the current location of the computing device being proximate to the particular geographical location.

15. The non-transitory computer-readable medium as in claim 14, further comprising:

initiating a change in temperature of at least the portion of the computing device.

16. The non-transitory computer-readable medium as in claim 11, further comprising:

creating a thermal state profile of the computing device, which comprises:

storing data representing each detected instance of the thermal state of the computing device; and storing data representing each detected instance of the physical orientation of the computing device.

17. A computer-implemented method, comprising:

detecting a thermal state of a computing device comprising a change of temperature of at least a portion of the computing device during a period of time;

detecting multiple instances of a physical orientation of the computer system comprising:

detecting the multiple instances of the physical orientation of the computer system, wherein each of the multiple instances of the physical orientation of the computer system occur during the period of time of the change of temperature; and detecting respective differences between each of the multiple instances of the physical orientation of the computer system; and initiating a notification to be displayed at the computer system based on the change of temperature indicated by the thermal state and due to a first subset of the respective differences falling within a first range of physical orientation differences and a second subset of the respective differences falling within a second range of physical orientation differences, the first range and the second range being different than each other.

* * * * *